United States Patent [19]

Jennings

[11] Patent Number: 5,392,944
[45] Date of Patent: Feb. 28, 1995

[54] LEAKED WATER COLLECTION PAN FOR EVAPORATIVE COOLER

[76] Inventor: Ray Jennings, 12582 Calle Tango, Tucson, Ariz. 85749

[21] Appl. No.: 125,305

[22] Filed: Sep. 23, 1993

[51] Int. Cl.$^6$ .............................................. B01D 47/00
[52] U.S. Cl. ........................................ 220/571; 62/291
[58] Field of Search ................... 220/571; 62/291, 150

[56] References Cited

U.S. PATENT DOCUMENTS

| | | |
|---|---|---|
| 3,479,948 | 11/1969 | Mathews . |
| 3,724,233 | 4/1973 | Pugh . |
| 4,419,300 | 12/1983 | Van Ness . |
| 4,479,366 | 10/1984 | Lanier . |
| 4,562,016 | 12/1985 | Colliver . |
| 4,687,604 | 8/1987 | Goettl . |
| 4,893,481 | 1/1990 | Sullivan . |
| 5,071,027 | 12/1991 | Sullivan . |
| 5,117,650 | 6/1992 | Kim . |

*Primary Examiner*—Joseph Man-Fu Moy
*Attorney, Agent, or Firm*—J. Michael McClanahan

[57] ABSTRACT

A collection pan for leaked waters from evaporative coolers is disclosed wherein a rectangularly shaped tray or pan resides underneath an evaporative cooler. The pan is characterized by four up extending sides at the outer perimeter of a flat rectangular base, the sides in height preferably greater than the sides of the base of the evaporative cooler.

Generally central to the collection pan situated at a position to conform to the location of the outlet duct in the base of the evaporative cooler is an opening duct, the opening duct also characterized by four up extending sides. This opening duct is adapted to protrude into the outlet duct of the evaporative cooler with the sides of the opening duct in close proximity to the sides of the outlet duct. The height of the the outlet duct sides of the collection pan are greater than the sides of the evaporative cooler outlet duct and, also greater than the height of the sides of the collection pan. Both the inner and outer perimeter sides of the collection pan are terminated with a rolled over lip for strengthening purposes.

Water which leaks through a corroded cooler base is caught in the collection pan.

12 Claims, 3 Drawing Sheets

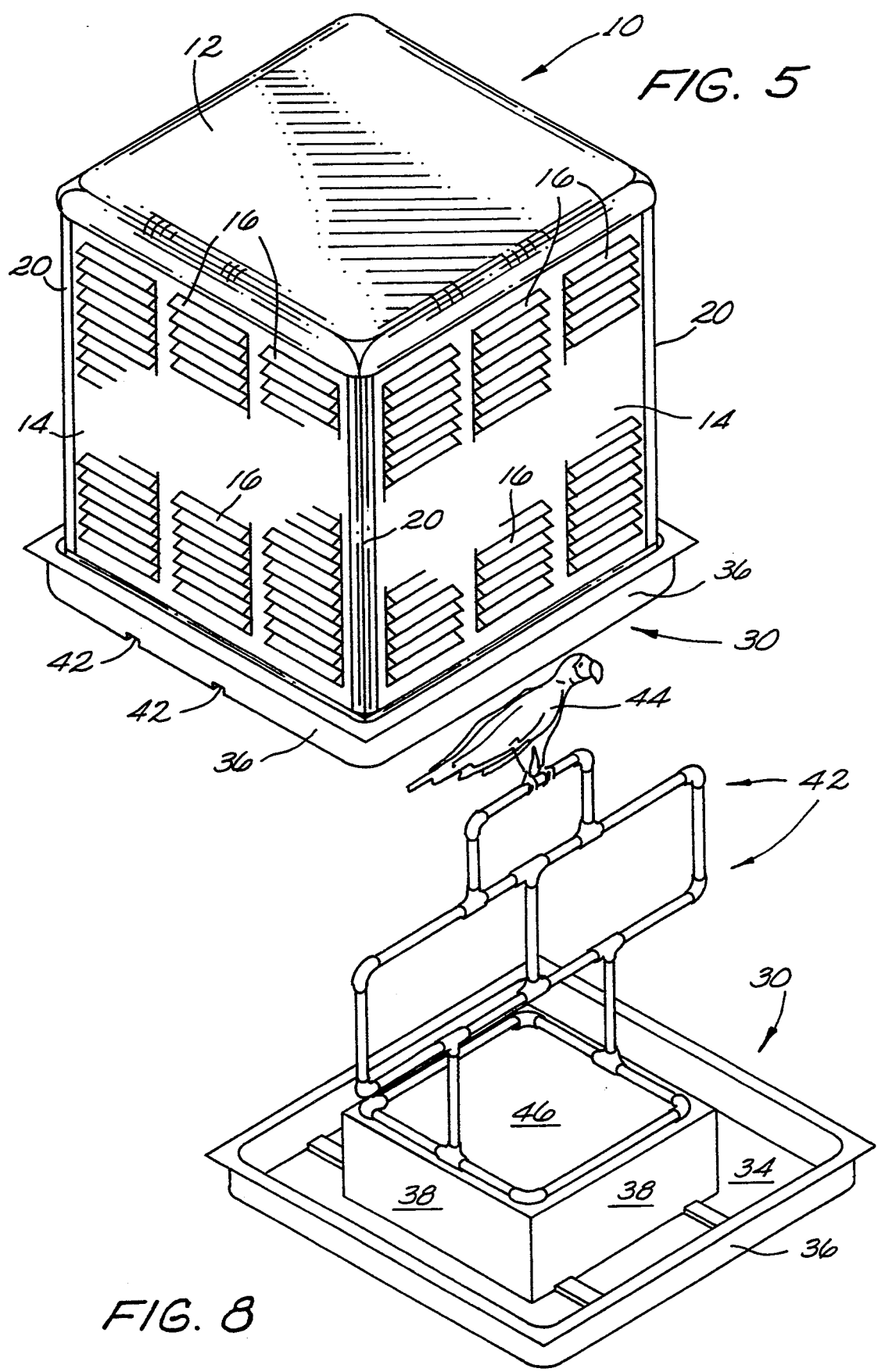

LEAKED WATER COLLECTION PAN FOR EVAPORATIVE COOLER

BACKGROUND OF THE INVENTION

1. Field of the invention

This invention relates generally to improvements for evaporative cooler structures and more particularly, to means for collection of leaked water from the evaporative coolers, a problem of especially aged evaporative coolers due to the effects of corrosion.

2. Description of the Prior Art

In areas of the world which have relatively hot or warm environments and which also have low relative humidity, the use of evaporative coolers for space cooling is very popular. These evaporative coolers, which operate on the principle that when water evaporates it takes in heat from the surrounding air and thereby effects a cooling of the air, are a relatively inexpensive method of cooling for residential and commercial buildings. In a typical evaporative cooler, air is drawn through water soaked pads which surround the inside of the cooler by means of an enclosed air blower, the air then exited from the evaporative cooler through a single duct in one side of the cooler. The typical evaporative cooler comprises a six sided oft times cube shaped cabinet with water saturated pads situated interiorly juxtaposed three or four of the vertical louvered sides with the air blower situated interiorly to the cabinet. One side of the cabinet has an opening therethrough to provide an outlet duct to vent the cooled air. Down draft coolers have pads situated on all four vertical sides of the evaporative cooler cabinet with the outlet duct in the base of the cooler. Side draft coolers have three vertical sides of pads with the outlet duct situated on the fourth vertical side.

In most evaporative cooler constructions, water is introduced into the rectangularly shaped base of the cooler, the base having raised up sides to form a water holding reservoir, the water maintained at a set level by a float actuated valve. The evaporative cooler resides with its flat base resting on a horizontal platform. Water is circulated to the vertical pads by a small motor driven pump, the water picked up from the bottom reservoir and distributed along the tops of the pads by means of flexible tubing. The water is evenly distributed over the top of the pads so to permit even percolation through all portions of the pads. Air passes transversely through the pads to evaporate the water into the air, resulting in cooling of the air.

Most present day evaporative coolers, and practically all coolers more than five years old, are made from sheet metal, principally galvanized sheet iron. These coolers, after a few years of use, are usually plagued with leaks. In this regard, with the constant presence of water in the reservoir base of the evaporative cooler, the water eventually gets under the zinc coating of the galvanized sheet iron and with the water containing dissolved oxygen, proceeds to oxidize or rust the iron. After a while, holes begin to appear in the base of the cooler and the cooler leaks water out through these holes. Typically the holes start out small where the water loss may be just a few drops per minute; however, over an extended period of time, and especially after a couple of years, the holes become quite large and permit excessive loss of water. Inasmuch as most areas of the world that are both hot with low relative humidity also suffer from a scarcity of water, water leaking from an evaporative cooler is wasted water.

An evaporative cooler will retain its structural integrity for many years, usually in excess of ten, even though it has suffered from rust corrosion and water leakage for a period of time for the reason that the holes generally appear in the flat base reservoir portion of the cooler. However, the leakage of the water can become quite excessive and costly. Presently, it is common to discard the evaporative cooler when it reaches the point that make-shift repairs are no longer able to stop the leaks.

Accordingly, it would be quite advantageous to provide means by which the water leaked from evaporative coolers may be collected in order that it not go to waste and that the usable life of the cooler is extended. Now, the inventor is aware of various other water holding devices whereby a plastic or non-corrosive liner is fitted to the inside floor of the cooler base reservoir so that it serves to protect the base reservoir. However, devices of this type known to the inventor do not catch all the water which percolates through the side pads since the water drips from the various parts of the pad and in some cases may drip between the plastic liner and inside of the sides of the base that form the bottom reservoir. Additionally, a complete seal by the liner is not made around the corner posts. Accordingly, water still works its way under the liner to rust out the cooler base. In addition, due to the construction of the bottom or down draft cooler, an inside liner, if of two pieces, must overlap twice, or if of one piece, must have one overlapping joinder.

SUMMARY OF THE INVENTION

The embodiment of the invention described consists of a collection pan or tray for water leaked from a conventional evaporative cooler due to the effects of corrosion or other causes. By collection of this leaked water, water is not wasted and the usable life of the evaporative cooler is measurably extended.

More particularly, the invention consists of a pan or tray adapted to reside underneath the base of an evaporative cooler between the evaporative cooler and the platform supporting it, the pan having a flat rectangularly shaped base of size larger than the base of the evaporative cooler. At the perimeter of the base are perpendicularly up extending sides. Located in the base of the collection pan is a rectangularly shaped opening duct, the opening defined by up extending sides rising perpendicularly from the base of the collection pan. These inner perimeter up extending sides of the opening are in the preferred embodiment of height greater than the height of the outer perimeter sides surrounding the outside of the base of the pan. Around the interior of the inner perimeter sides defining the opening duct is an inwardly extending rolled over lip, this lip imparting structural strength to the construction of the opening duct. Running across the base is a pair of parallel longitudinal indentations formed in the base, there to impart structural strength to the base of the invention.

Lastly, around the top of the outer peripheral sides of the collection pan is an outwardly extending rolled over lip, also to impart strength to the structure of the invention.

In use, the invention receives an evaporative cooler into the cavity or depression formed in the pan, the collection pan residing underneath the evaporative cooler and between the cooler and its platform. Since, by design, the length and the width of the collection pan is greater than the length and the width respectively of the base of the evaporative cooler, a space of one to two inches is provided between the vertical sides of the evaporative cooler and the vertical outer perimeter sides of the collection pan.

The opening duct defined by the vertical opening duct inner perimeter sides of the collection pan is so located upon the base of the collection pan that it conforms to the location of the outlet duct located in the base of the evaporative cooler. The length and width of the opening duct of the pan are less than the length and width respectively of the outlet duct of the evaporative cooler. By this means, the inner perimeter sides of the opening duct rise up into the outlet duct of the cooler. Preferably, the height of the inner perimeter sides of the collection pan opening duct are greater than the height of the sides defining the outlet duct of the cooler.

When the evaporative cooler with the invention in place is installed upon a building or other structure, the duct work of the building through which the cooled air from the evaporative cooler passes rises up into the inner perimeter sides, of the opening duct of the collection pan. Thus, air expelled from the evaporative cooler still passes directly into the duct work of the building.

The function of the invention is to collect water which leaks through the base of the evaporative cooler due to holes formed by corrosion, or water which may drip from the outside of the cooler, the water collected and thereby prevented from being wasted or going onto the roof of the building, or down into the duct work in the building.

In addition, the invention of the preferred embodiment also possesses outer perimeter sides whose height are greater than the height of the up extending sides of the base of the evaporative cooler. By this, in the event water inside the evaporative cooler base should rise above the sides of base of the cooler and escape the cooler that way, it will still be contained within the confines of the collection pan.

In an alternate embodiment of the invention, weep holes are situated at a strategically located height above the base on the outer perimeter sides of the collection pan so as to permit the controlled escape of water from the collection pan. This may be a safety measure in the event that the cooler construction or perhaps the duct work from the building on which the cooler resides, does not permit the inner perimeter sides of the collection pan to be greater in height than the outer perimeter sides, or of the height of the cooler outlet duct sides. By this means, water will escape from the weep holes in the outer perimeter sides prior to overflowing the inner perimeter sides and entering the building.

Accordingly, it is an object of the subject invention to provide a pan or tray for collection of leaked water from the evaporative cooler.

It is another object of the subject invention to provide a collection pan which measurably extends the useful life of an evaporative cooler.

It is still another object of the subject invention to provide a collection pan for leaked water from an evaporative cooler whereby possible entrance of the leaked water into the building structure is further reduced.

Other objects of the invention will in part be obvious and will in part appear hereinafter. The invention accordingly comprises the apparatus possessing the construction, combination of elements, and arrangement of parts which are exemplified in the following detailed disclosure and the scope of the application which will be indicated in the claims.

BRIEF DESCRIPTION OF THE DRAWINGS

For further understanding of the features and objects of the subject invention, reference should be made to the following detailed description taken in combination with the accompanying drawings wherein:

FIG. 5 is a perspective view of the subject invention in place underneath an evaporative cooler;

FIG. 8 is a perspective view of still another alternate embodiment of the subject invention.

In various views, like index numbers refer to like elements.

DETAILED DESCRIPTION OF THE PREFERRED EMBODIMENT

Figure 1:
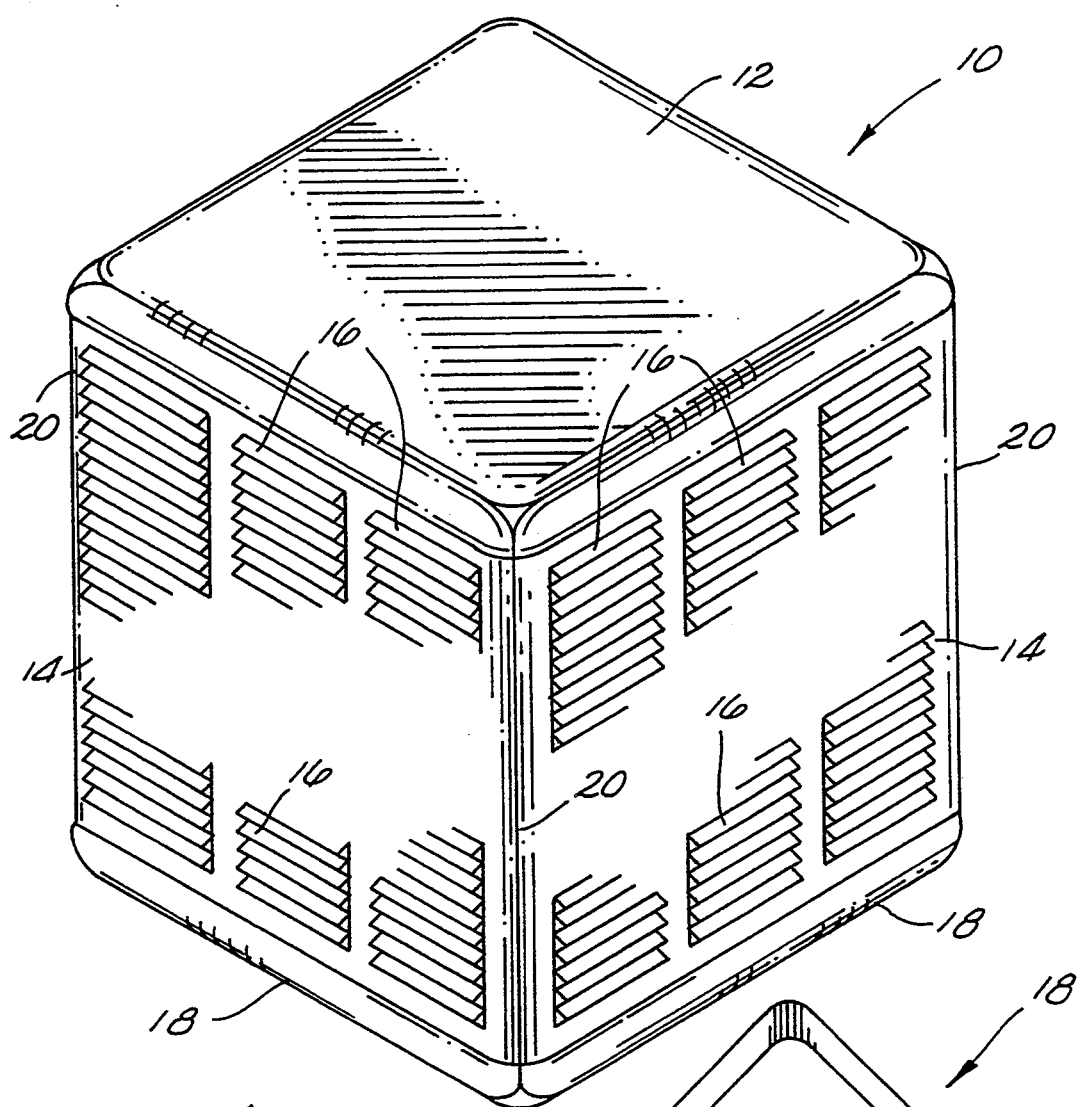
FIG. 1 is a perspective view of an evaporative cooler to which the invention is applicable.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Reference is now made to the drawings wherein like characteristics and features of the present invention shown in the various figures are designated by the same reference numerals.

Referring firstly to FIG. 1, a prior art evaporative cooler structure 10 is shown in a perspective view. The cabinet of evaporative cooler 10 comprises rectangular top 12 joined by four rectangular sides, namely ventilator panels 14, so called because of louvers 16 formed through the panels, rectangular base 18, and corner posts 20, of which there are four. Generally, coolers are constructed somewhat in the shape of the cube shown although in not all instances will the sides be square. The surrounding environment air enters the cooler through louvers 16 of the four ventilator panels 14. To draw air into evaporative cooler 10 is an interiorly located blower assembly (not shown), the air then exiting the evaporative cooler through an outlet duct situated generally central in base 18 (down draft cooler).

As indicated previously, inside the cabinet of evaporative cooler 10 and juxtaposed louvers 16 of the ventilator panels are water soaked pads, usually made of strings of aspen wood. Water percolates through these pads from the top of the cooler to the bottom. Air drawn into cooler 10 by the contained blower assembly passes through louvers 16 and through the water soaked pads causing evaporation of the water with resultant cooling of the air. Water is held in base 18 at a level of two to three inches by a float actuated valve (not shown), the valve connected to an outside source of water. Water is circulated from the reservoir formed by base 18 to the tops of the pads (not shown) by means of a motor driven pump (not shown).

Figure 2:
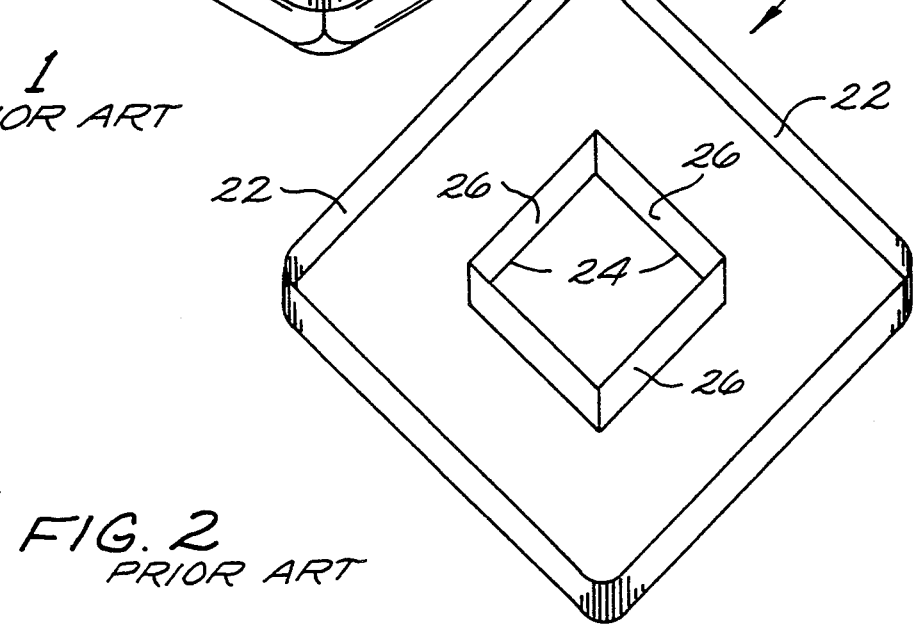
FIG. 2 is a perspective view of the base of a down draft evaporative cooler to which the invention is applicable.

Referring now to FIG. 2, a perspective view of down draft cooler base 18 is shown separated from the cabinet of evaporative cooler 10. Base 18 is usually a rectangularly shaped pan with four up extending perpendicular perimeter sides 22 and a somewhat centrally located opening therethrough, namely air outlet duct 24. Outlet duct 24 is characterized by four upwardly extending perpendicular perimeter sides 26 which rise up from base 18 to define an air passageway. Since water resides in the central annularly shaped reservoir formed by base perimeter sides 22 the bottom of base 18, and outlet duct perimeter sides 26, the corners formed by both the inner outlet perimeter sides 26 and outer base perimeter sides 22 must be soldered together or otherwise secured so as not to allow water to leak from the formed reservoir. In some cases, base 18 is constructed by metal stamping and drawing techniques so there are no seams of joined sides.

A cooler blower assembly (not shown) is mounted to the top lip of sides 26 of outlet duct 24. Generally this is accomplished by rolling over the top most part of sides 26 to form an outwardly extending lip, which lip receives a complementary rolled over portion of the air outlet of the blower assembly in a mating arrangement, the two then joined by a mechanical fastening mechanism, all well known in the art.

Since in most instances, base 18 is made from sheet metal, usually galvanized iron, it will withstand the effects of water corrosion for a couple of years. However, since the water residing in the formed reservoir is usually highly charged with air due to its continual percolation through the pads, the water with the dissolved oxygen will in time get under the zinc galvanized coating or penetrate the soldering of one of the corners of outlet duct 24 or outer perimeter sides 22. When that happens, corrosion sets in and in time, the iron oxidizes and eventually one or more holes are created through the metal of base 18 which permits water to leak out. Presently, petroleum based coatings are available to limit leakage, the coatings sprayed or brushed onto base 18 so as to inhibit corrosion and plug existing holes. These coatings, while accomplishing their purposes for a time, do not provide a substitute for a fully non-corroded base and, eventually the base will leak.

Because of the construction of evaporative cooler 10, and to the fact that corrosion is limited primarily to the base of the cooler, structural integrity of the cooler is not seriously compromised by holes in base 18 so the cooler is still very much operable if means to collect the leaked water are provided. It is to this solution of the collection of the leaked water that the subject invention is directed.

Figure 3:
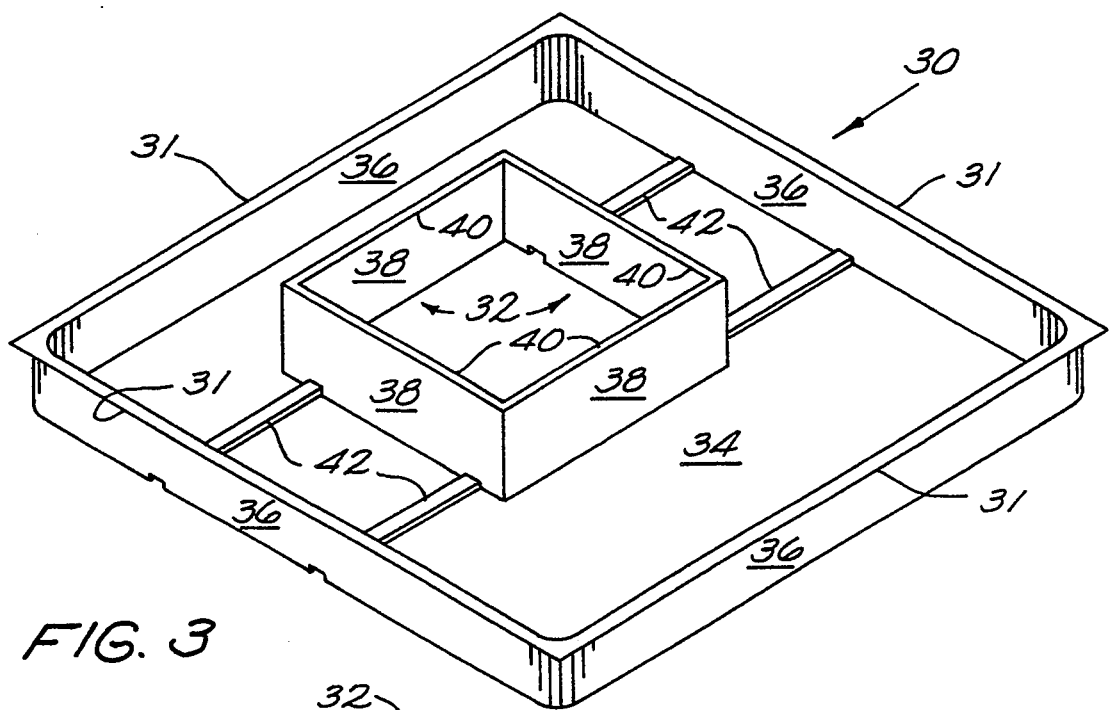
FIG. 3 is a perspective view of the subject invention.

FIG. 3 is a perspective view of the subject inventive leaked water collection pan or tray for an evaporative cooler. Collection pan 30 is adapted to receive evaporative cooler 10 with the base of the cooler residing within the formed cavity. Collection pan 30 is preferably formed from a single sheet of durable plastic and comprises rectangular base 34 with four upwardly extending perimeter sides 36, the sides being at right angles to the plane of base 34. Generally central to collection pan 30, and as an integral part of pan 30 is an opening, namely duct 32.

Since evaporative cooler 10 resides interiorly the depression formed in collection pan 30, the length and width of base 34 must be larger than the corresponding length and width of base 18 of evaporative cooler 10, preferably by two to four inches. It is also preferred that the height of outer base perimeter sides 36 of collection pan 30 be greater than the height of outer perimeter sides 22 of base 18 of the evaporative cooler. This is so because the maximum water level of the reservoir interiorly to base as is usually determined by the height of the sides of the base. Therefore, in the event that water should leak from evaporative cooler 10 by overflowing the sides of the base 18, it will be caught in collection pan 30. Nevertheless, will be seen later, the invention will still operate substantially as intended even with the height of its outer perimeter sides less than the height of the cooler base sides.

As mentioned earlier, generally central to base 34 of collection pan 30 is duct 32. Duct 32 is an opening with up extending sides so sized that its vertical sides reside interiorly to the sides of outlet duct 24 of base 18 when the invention is in place under the cooler. Further, it preferred that inner perimeter sides 38 of opening duct 32 have a height greater than the height of outer perimeter sides 36 of collection pan 30. By this means, as pan 30 rests horizontally holding a leaking cooler, water which collects in pan 30 will never overflow side 38 to possibly enter the duct work of the residence or business or other structure to which the evaporative cooler is attached but, would first overflow the outer perimeter sides 36. Now this scenario would most likely only happen in the event of a malfunctioning float valve where control was lost of water entering the evaporative cooler. In the Inventor's experience this is a rare occurrence.

Continuing with FIG. 3, upwardly extending sides 38 of opening duct 32 are at right angles to base 34 and have at their top, an inwardly extending rolled over lid 40, placed there to impart strength to the construction of duct 32. Similarly, an outwardly extending rolled over lip 31 is seen at the top of outer sides 36, there also to impart strength to the outside portion of the invention.

It is noted that duct 32 is slightly off center in its position sited in base 34. This is so because outlet ducts 24 of most evaporative coolers are also slightly off center in the base of the cooler. Obviously then, with any evaporative cooler, to conform collection pan 30 to base 18 of evaporative cooler 10, duct 32 of collection pan 30 must be so located in pan 30 that its inner perimeter sides 38 rise up interiorly to the inner perimeter sides of the outlet duct of the cooler base.

Lastly, strengthening ribs 42 formed by longitudinal indentations are shown traversing base 34 of collection pan 30, all for the purposes of further strengthening the structure defining the invention.

Figure 4:
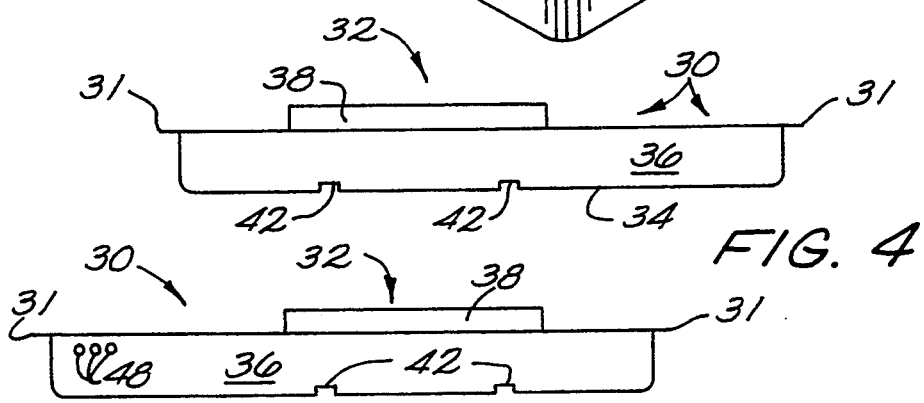
FIG. 4 is a side elevation view of the subject invention.

Referring now to FIG. 4, for illustrative purposes, a side view of the inventive collection pan 30 is shown. Particularly illustrated is the relative difference in the heights of outside perimeter side 36 and the inside perimeter side 38 which defines duct 32. Also shown in FIG. 4 are the ends of strengthening ribs 42 and outwardly extending lip 31. It is remembered, although not shown, that inwardly extending lip 40 resides at the very top of inner perimeter sides 38 of duct 32.

FIG. 5 is a perspective view of the subject invention in use, namely situated underneath an evaporative cooler. More particularly, evaporative cooler 10 is seen resting in the depression or cavity formed in collection pan 30 wherein the base of cooler 10 rests upon the base of collection pan 30. In the configuration shown in FIG. 5, the base of the collection pan 30 is larger than the base of cooler 10 so that there is an inch or two spacing on all sides between each of the sides of the base as well as ventilator panels 14 of cooler 10 and up extending sides 36 of collection pan 30.

Not shown in FIG. 5, but prior described and shown, opening duct 32 (FIGS. 3 and 4) of collection pan 30 rises up interiorly to outlet duct 24 (FIG. 2) of evaporative cooler 10. It is anticipated that there should be very little spacing, if any, between the inner perimeter sides of opening duct 32 of collection pan 30 and the inner perimeter sides of the outlet duct of cooler 10. While space allotted between the cooler and the outer perimeter sides of collection pan 30 surrounding the outside of cooler 10, it preferred that a near glove type relationship exist between the inner perimeter sides of the collection pan and the cooler outlet duct. One reason for this is that the duct work of the structure to which evaporative cooler 10 is attached rises up into the outlet duct of cooler 10. Usually, this duct is only slightly smaller than the outlet duct of the cooler. Accordingly, with the invention in place, the building structure duct work rises up interiorly to the opening duct of collection pan 30. The building structure duct work should not, however, rise up so far as to engage the inwardly directed top lip of the duct in collects on pan 30.

It is also noted (although not seen) in connection with the installation of the invention to an evaporative cooler as shown in FIG. 5, inner perimeter sides 38 of central duct 32 of collection pan 30 are greater in height than inner perimeter sides 26 of outlet duct 24 of cooler 10. By this means, the inner perimeter sides of the duct of the collection pan will protrude a small distance into the blower assembly which attaches to the sides of the cooler outlet duct. This may usually be done.

It may also be seen from FIG. 5 why the height of outside perimeter sides 36 of collection pan 30 need not necessarily be greater than the height of the sides of base 18 of evaporative cooler 10. Clearly, with the space between the cooler and sides 36 of pan 30, water overflowing the sides of base 18 would still be caught in collection pan 30. However, in time the water would also overflow pan 30.

Figure 6:
FIG. 6 is a side elevation view of an alternate embodiment of the subject invention.

Referring now to FIG. 6, an alternate embodiment of the invention is shown in a side view of collection pan 30 taken from tile opposite side as that shown in FIG. 4. Here, formed in side 36 of collection pan 30 are a number of strategically located weep holes 48. These weep holes permit the release of excess water from collection pan 30 if the water rises in pan 30 to the level of the holes. This limits the height of water which may be contained within the collection pan. This may be necessary in situations where the up extending sides 38 of duct 32 (of collection pan 30) could not be extended into the blower assembly as earlier mentioned, perhaps because of the particular construction of the blower assembly. Weep holes 48 then would provide a safety release of water out of collection pan 30 before the water could overflow the inner perimeter sides 38 of the duct 32. This would be especially appropriate if there were concerns about water entering the building structure supporting the cooler.

Figure 7:
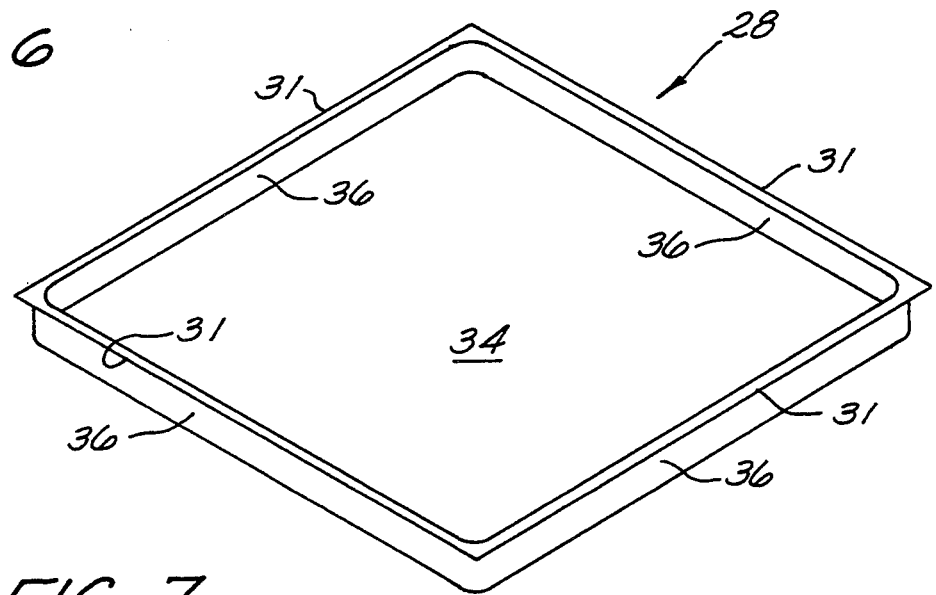
FIG. 7 is a perspective view of a second alternate embodiment of the subject invention.

A second alternate embodiment of the invention is shown in FIG. 7 for use with side draft evaporative coolers wherein base 34 of collection pan 28 has no opening duct for a cooler outlet duct. Here, all the elements shown are similar to those shown and described in connection with the invention shown in FIG. 3 except opening duct 32 and strengthening ribs 42 have been eliminated. In side draft coolers, the outlet duct is situated on one of the vertical sides, the cooler having three vertical ventilator panels rather than four as is the case for down draft coolers.

Accordingly, base 34 of collection pan 28 shown in FIG. 7 is flat from one side to the other. Here also, as in connection with collection pan 30, upwardly extending sides 36 are again preferably greater in height than the sides of the base of the evaporative cooler although, as previously stated, they need not be. Also, outwardly extending rolled over lip 31 is seen at the top of upwardly extending sides 36, rolled over lip 31 providing structural strength to the invention.

A third different and rather novel use of the invention is shown in FIG. 8 wherein the invention is used as an animal island. Here, collection pan 30 is shown as a supporting base for pipe maze 42 upon which a bird, such parrot 44, rests. Collection pan 30 had been previously constructed in the invention such that following initial vacuum forming of the pan, the top flat surface which covered duct 32 was cut out leaving the rolled lip. Here an opening is not cut out. Thus, up extending sides 38 rising from base 34 do not terminate in an opening, but join to flat support plate 46. Upon this plate rests pipe maze 42, which may be of any shape desired. Preferably also, pipe maze 42 is constructed from plastic pipe.

In the use of collection pan 30 as a animal island, the donut shaped reservoir defined by base 34 and inner and outer perimeter sides 38 and 36 respectively, may be used to catch animal droppings or food which has been scattered by the animal. By such means, the area surrounding collection pan 30 may be kept relatively clean with pan 30 periodically removed for cleaning itself. Cleaning may be accomplished by spraying a stream of water on the pan.

While the invention has been described, disclosed, illustrated, and shown in certain terms or certain embodiments or modifications which it has assumed in practice, the scope of the invention is not intended to be, nor should it be, deemed to be limited thereby and such other modifications or embodiments as may be suggested by the teachings herein are particularly reserved, especially as they fall within the breadth and scope of the claims here appended.

I claim:

1. In combination, an evaporative cooler and a collection pan residing under said evaporative cooler for collection of leaked waters from the evaporative cooler, said evaporative cooler of the type defined by a cabinet construction having vertical sides joining a connecting flat horizontal base having a length and a width, said base also having an outlet duct located therein to permit the exit of cooled air, and said collection pan comprising;

a flat base, said base having a perimeter;

an opening situated through said base;

a plurality of sides attached to said base at said perimeter, said perimeter sides perpendicular to said flat base, said base and said perimeter sides forming a pan-shaped depression; and a plurality of sides attached to said base at said opening to form an opening duct, said opening duct sides perpendicular to said base, said collection pan residing underneath the base of said evaporative cooler with said opening duct sides protruding into the evaporative cooler outlet duct, said collection pan to catch and retain water leaked from the evaporative cooler.

2. The combination as defined in claim 1 wherein said base of said collection pan has a length and a width, said collection pan base length and width greater than the evaporative cooler base length and width respectively, said collection pan base perimeter sides spaced apart from the evaporative cooler base and vertical sides when said collection pan resides underneath the evaporative cooler.

3. The combination as defined in claim 2 further including an outwardly extending lip attached to said base perimeter sides, said outwardly extending lip attached to said sides distal from said attachment to said base.

4. The combination as defined in claim 3 further including an inwardly extending lip attached to said opening perimeter sides, said inwardly extending lip attached to said sides distal from said attachment to said base.

5. The combination as defined in claim 4 wherein said base includes at least one elongated strengthening rib crossing said base.

6. The combination as defined in claim 5 wherein said opening perimeter sides have a height, and said base perimeter sides have a height, said opening perimeter sides' height greater than said base perimeter sides' height.

7. The combination as defined in claim 6 wherein the outlet duct of the evaporative cooler has sides which have a height above the base of the cooler, said collection pan opening perimeter sides' height greater than the evaporative cooler outlet duct sides' height.

8. The combination as defined in claim 7 wherein the outlet duct of the evaporative cooler has a length and a width, and said opening duct of said collection pan also has a length and a width, said collection pan opening duct length and width less than the evaporative cooler outlet duct length and width respectively such that the sides of the collection pan opening duct sides are interior to aped juxtaposed the evaporative cooler outlet duct sides when said collection pan resides underneath the evaporative cooler.

9. The combination as defined in claim 8 further including a plurality of weep holes, said weep holes formed in said base perimeter sides, said weep holes adapted to permit the escape of waters collected in said collection pan.

10. The combination as defined in claim 9 wherein said weep holes situated in said base perimeter sides are located a defined distance above said base.

11. In combination, an evaporative cooler and a collection pan residing under said evaporative cooler for collection of leaked waters from said evaporative cooler, said evaporative cooler of the type defined by a cabinet construction having a plurality of vertical sides joining a connecting flat horizontal base, one of said plurality of vertical sides having an outlet duct therethrough to permit the exit of cooled air, and said collection comprising:

a flat base, said base having a perimeter;

a plurality of sides attached to said base at said perimeter;

a plurality of weep holes situated in said plurality of perimeter sides, said weep holes spaced from said base, said base and said sides forming a pan-shaped depression adapted to receive the base of the evaporative cooler with said collection pan residing underneath the evaporative cooler to catch and retain water leaked from the evaporative cooler, and said weep holes allowing water to leave the collection pan when water in pan reaches the level of said weep holes.

12. The combination as defined in claim 11 further including an outwardly extending lip attached to said base perimeter sides, said lip attached to said sides distal from said attachment to said base.

* * * * *